2,892,873
PHOSPHINOBORINES

Charles P. Haber, Corona, and Charles O. Wilson, Jr., Pasadena, Calif., assignors to American Potash & Chemical Corporation, a corporation of Delaware No Drawing. Application April 22, 1957
Serial No. 654,070

5 Claims. (Cl. 260—606.5)

This invention relates to the manufacture of polymers of phosphinoborines and more particularly to the preparation of a group of P-substituted compounds of the general formula:

$$[-RR'PBH_{2-n}R''_n]_x$$

wherein $x$ is a whole number indicative of the degree of polymerization; R is any alkyl or aryl radical; R' is H, an alkyl or an aryl radical; R'' is methyl; and $n$ is 0–2 as will be presently explained.

Substituted phosphinoborines have been made heretofore by the reaction of substituted phosphines, $R_nPH_{3-n}$, wherein R is methyl and $n$ is 1 or 2, with diborane or the substitued boranes $R_nB_{3-n}$ where R is methyl and $n$ is 1 or 2.

This method has serious disadvantages in that the substituted phosphines are difficult to make and, in the case of the methyl compounds, are secured only in low yields. Further, they possess an extremely unpleasant odor, making them difficult to handle. In addition, the use of diborane as a source of borane complexing agent requires the employment of high vacuum equipment and the use of an extremely toxic and explosive reagent. However, materials falling within the above formulae are polymeric and certain of them display unusual chemical and thermal stability as they are basically inorganic in nature rather than organic—in contrast to most polymers.

It is therefore an object of this invention to provide a method for the preparation of certain phosphinoborines which does not necessitate the handling of diborane.

A further object of this invention is to provide a method for the preparation of P-substituted phosphinoborines by the reduction of dialkyl and diaryl substituted halophosphines with a metallic borohydride or a substituted metallic borohydride.

Further objects and advantages of this invention, if not specifically set out, will become apparent during the course of the detailed discussion which follows.

Generally, it has been found that a substituted halophosphine will be reduced by a metallic borohydride or a substituted borohydride to yield metallic halide and a phosphine-borine intermediate of not definitely ascertained composition which may then be pyrolyzed to yield the desired phosphinoborine polymer which is P-substituted with the evolution of hydrogen. While it is not desired to limit the invention to any particular theory of reaction, it is believed that it proceeds in this fashion and it is known that it yields phosphinoborines containing a cyclic polymer having at least three of the [RR'PBHR''] groups. Lesser quantities of higher polymers are also obtained.

More particularly, it has been found that a substituted halophosphine will react with an alkali metal borohydride, the reaction in all probability proceeding according to the equations:

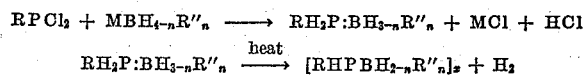

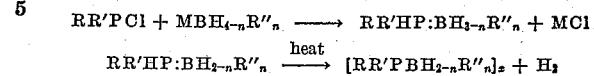

and:

$$RR'PCl + MBH_{4-n}R''_n \longrightarrow RR'HP:BH_{3-n}R''_n + MCl$$

$$RR'HP:BH_{2-n}R''_n \xrightarrow{heat} [RR'PBH_{2-n}R''_n]_x + H_2$$

wherein R' is used in the second formula to indicate an alkyl or aryl radical, all other symbols being used in the fashion set out above.

Preferred alkyl and aryl substituents are ethyl and phenyl and preferred alkali metal borohydrides are lithium borohydride, sodium borohydride and potassium borohydride.

To practice the invention, the reagents are dissolved in a suitable inert solvent such as anhydrous diethyl ether or diethylene glycol dimethyl ether, $(CH_3OC_2H_4OCH_3)$. Any of the well known solvents of this type will serve since the solvent used in no way affects the reaction between the borohydride and the halophosphine. The phosphine solution is added slowly with stirring to the borohydride solution under anhydrous, oxygen-free conditions. The solvent is removed by distillation and the residual liquor heated preferably to 100° C. to form the substituted phosphinoborine polymer with the evolution of the hydrogen. This product is readily purified by recrystallization, such as from dioxane and n-heptane in accordance with well known crystallization procedures.

Examples are set forth below which are to be regarded as illustrative of the invention and not by way of limitation.

EXAMPLE I

In order to prepare the polymer of diphenylphosphinoborine, an ethereal solution of 7 g. of $LiBH_4$ was added slowly with stirring to an ether solution of 59.5 g. of diphenylchlorophosphine. During the addition there was a small evolution of a non-condensable gas and practically no heat evolution. A white precipitate separated. Stirring was continued for two to three hours after the addition had been completed and the mixture allowed to stand for about sixteen hours. The precipitate was separated, washed with ether and the washings added to the ether solution. The solvents were removed by atmospheric distillation until the volume of the residue was near that expected for the product, and then distillation was continued under 3–5 mm. pressure to remove the remaining solvent. At this point a very peculiar thing happened; the solution was absolutely water clear, completely colorless; but on removal of the last traces of solvent (bath temperature 170–200° C. at 1 mm.), the residue turned bright yellow and on cooling set to a brittle amorphous solid (I). Determination of the molecular weight of this intermediate material showed that it corresponded to a cyclic trimer: found 572; calculated 594. In all events, irrespective of the actual structure of the compound, this solid (I) contained boron and aromatic groups but no chlorine or lithium. During the removal of solvent no additional gas evolution occurred. The material melted near 160° C. but on trying to distill it under a pressure of 1 mm., it was noticed that melting was accompanied by a vigorous evolution of gas which did not condense in a Dry-Ice acetone trap. This particular reaction continued and was accompanied by a slow darkening of the material, after four to five hours of heating at 180° C. at 1 mm., to an orange-yellow material. This material was placed in a Teflon dish in an oven at 260° C. for four days and the evolution of gas continued for most of that time. At the end of four days a solid (II) remained, light orange in color and quite similar in brittleness to (I) which would not melt at temperatures available in the melting point apparatus around the laboratory. By way of contrast, when some of (I) was placed on a melting point block and heated for several hours at 300° C., it was slowly converted with gas evolution to (II) compound. Compound (II) is soluble in benzene and xylene. Portions of compounds (I) and (II) were heated in xylene solution in an amount calculated to correspond to three moles of phenyldichlorophosphine to one mole ring compound in an effort to cross-link the rings, if such existed; these solutions were refluxed for about 150 hours with continuous evolution of HCl and during this time a white powdery material slowly precipitated. After evolution of HCl effectively ceased each precipitate was collected by filtration and found to be even more thermally stable than (II). It required dull red heat over an open flame to cause slow decomposition without melting. The xylene solution remaining yielded in both cases a material resembling solid (I) which melts below 200° C. and slowly evolves a gas at that temperature.

EXAMPLE II

The same method was applied for making trimeric $(C_2H_5)_2PBH_2$. A 39-gram sample (0.32 mole) of $(C_2H_5)_2PCl$ was dissolved in 100 ml. of pure diethylene glycol dimethyl ether, and the solution was slowly (45 minutes) added to 16 g. (0.42 mole) of $NaBH_4$ in 50 ml. of the ether (H. C. Brown, E. J. Mead, and B. C. Subba Rao, J. Am. Chem. Soc. 77, 6209 [1955]). The containing flask was equipped with a water-cooled reflux condenser, a nitrogen inlet, and an outlet through a trap at −196° C. to a receiver for the measurement of evolution of hydrogen. The addition of the diethylchlorophosphine resulted in precipitation, and when the self-heating raised the temperature above 60° C., some hydrogen was evolved, to a total of two liters. Further heating at 100° C. raised the total $H_2$ by 1250 ml. The solids were filtered off and the ether was removed by an extended process of high-vacuum distillation at room temperature; some of the intermediate $(C_2H_5)_2PH.BH_3$ complex evidently came with it, and was recognized as a water-insoluble component which yielded one liter of $H_2$ when the distillate was refluxed for 12 hours. This viscous residue from the removal of the solvent—presumably the main yield of the $(C_2H_5)_2PH.BH_3$ complex—yielded three liters of $H_2$ on heating from 140 to 170° C. during two hours, and then 850 cc. more $H_2$ during 10 hours at 175–180° C. (oil bath temperatures). The two processes yielded a total of 6600 cc. of $H_2$ (calcd., 7168). The main product, distilled under a manometer-reading of 1 mm. in a temperature range of 170–190° C. was mostly the cyclic trimer of $(C_2H_5)_2PBH_2$.

EXAMPLE III

An ether solution of 9 g. of lithium borohydride and 36 g. of phenyl dichlorophosphine were reacted, the lithium compound being added to the $C_6H_5PCl_2$. An exothermic reaction ensued with the formation of an insoluble white powder. No gas was visibly evolved. After the reaction was complete the solution was filtered, the lithium chloride was collected on a fine, sintered glass funnel, and washed a couple of times with ether. The yield of LiCl was 16.8 g. as against a theoretical of 17.4 g.

The ether from which the LiCl was filtered was distilled to yield a cloudy, colorless liquid residue. A portion of this liquid residue was then heated in an oil bath and gas evolved during the entire heating procedure. The point of most voluminous gas evolution was at 115° C. and this gas was determined to be hydrogen with small amounts of decomposition products present. The stable liquid was distilled at 70° C. and 15–20 mm. (making its B.P. about 170° C.). The liquid that distilled contained no boron and on completion of distillation a hard, brittle, orange-yellow amorphous solid material remained. The solid did not melt on heating, tested positively for boron and burned with an aromatic character. It was mostly the trimer of $[—C_6H_5HPBH_2—]$.

EXAMPLE IV

By a similar method of synthesis the copolymer $(C_2H_5)_5HP_3B_3H_6$ was prepared—a substance boiling at 160° C. under a good vacuum, and maintaining some mobility as a liquid even at −78° C. It was made from a 46-gram portion of the 2:1 (azeotropic) mixture of $(C_2H_5)_2PCl$ and $C_2H_5PCl_2$, which was added dropwise to a solution of 20 g. of 85% pure $NaBH_4$ in 150 ml. of diethylene glycol dimethyl ether during 1.5 hours. The reaction mixture warmed up steadily, beginning to give off a gas at the end of the addition. Next the flask (containing the NaCl precipitate and presumably a mixture of P—$NH_3$ complexes) was heated in an oil bath with measurement of the evolved hydrogen, as shown in Table 1. A trap at −196° C. between the flask and the hydrogen-collector, showed no condensate as a result of the process.

Table 1

EVOLUTION OF HYDROGEN FROM THE BORINE COMPLEX

| Time (Hrs.) | 0.5 | 2.17 | 3.17 | 3.42 | 5.17 | 8.17 | 11.17 |
|---|---|---|---|---|---|---|---|
| (Temp. (°C.)to(oil bath itself) | 110 to 145 | | 150 | 180 | 180 | 190 | 190 |
| $H_2$ (cc. gas) | none | 1,250 | 2,500 | 3,030 | 4,280 | 5,680 | 6,780 |

During this process refluxing was observed at a bath temperature of 180° C., representing the upper limit of internal temperature. The solvent was removed from the colorless product, by vacuum-distillation at 33–37° C. The distillation contained a trace of water-insoluble oil—probably representing unused borine complex. The tacky white residue in the flask was extracted by 200 ml. of benzene and filtered through sintered glass; the solid now had the looseness expected of sodium chloride. After removal of the benzene, the product was twice-distilled under high vacuum, first coming over in the range of 150–169° C. (manometer reading 2 mm.) and then in the range of 157–161° C. with the manometer at 1.5 mm. The 17-gram product (representing 52% of the whole) finally was distilled once more (158–162° C., manometer 3 mm.), for the middle fraction which was taken for the molecular weight determination and analysis. The stoichiometry demands 8.13 liters of hydrogen based on a complete conversion of the ethylchlorophosphine compounds to phosphinoborines, and the maximum yield would thus near 33 grams. The random combination of $C_2H_5PHBH_2$ with $(C_2H_5)_2PBH_2$ units forms a little high-polymeric $(C_2H_5PHBH_2)_m$, some

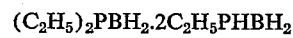

$(C_2H_5)_2PBH_2.2C_2H_5PHBH_2$ or similar higher polymer, and some $[(C_2H_5)_2PBH_2]_3$, not easily separable from the main product,

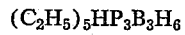

$(C_2H_5)_5HP_3B_3H_6$

Some higher polymers of the main product also are present.

It is seen therefore that polymers may be prepared which have varying numbers of alkyl and aryl groups (1–2) substituted on the phosphorous atom and copolymers may also be prepared by the simple expedient of mixing the substituted halophosphines used as reactants. Most conveniently, the reaction between the phosphine and the borohydride are carried out at room temperatures, although slightly higher or lower temperatures (20°–65° C.) may sometimes be used. The heating of the intermediate preferably is carried out at between 100 and 150° C. though extremes of 50 to 180° C. are practical and even higher or lower temperatures may sometimes be used.

Other phosphines than ethyl chlorophosphines and phenyl chlorophosphines are also suitable. Additional especially suitable organic substituent groups are propyl and butyl. Halophosphines which serve are the chlorophosphines, bromophosphines and iodophosphines. Alkali metals, combined in a borohydride molecule, which are especially suitable, are lithium, sodium and potassium.

As pointed out in the co-pending application, Serial No. 446,147, filed July 27, 1954, for "Phosphinoborine Compounds and Their Preparation," these phosphinoborine polymers are useful as dielectrics.

Obviously many modifications and variations of the invention as hereinbefore set forth may be made without departing from the spirit and scope thereof, and therefore only such limitations should be imposed as are indicated in the appended claims.

We claim:

1. A process for the preparation of a phosphinoborine polymer of the general formula $[RR'PBH_{2-n}(CH_3)_n]_x$ wherein R is selected from the class consisting of lower alkyl and phenyl substituents, R' is selected from the class consisting of H, lower alkyl and phenyl, $n$ is 0 to 2, and $x$ is a whole number indicative of the degree of polymerization comprising: contacting a compound of the formula $MBH_{4-n}(CH_3)_n$, wherein M is an alkali metal and $n$ is 0 to 2 with a compound selected from the group consisting of lower alkyl halophosphines and phenylhalophosphines, whereby to form a phosphine borine of the general formula $RR'—HP:BH_{3-n}(CH_3)_n$, wherein R, R' and $n$ are as defined above said reaction being carried out in an inert solvent under substantially anhydrous conditions, and thereafter heating said phosphine borine so formed to remove said solvent and continuing to heat the remaining product so formed whereby to yield said phosphinoborine polymer and hydrogen.

2. The process of claim 1 wherein said intermediate is heated to a temperature of at least about 100 to 120° C.

3. The process of claim 1 wherein the compound $MBH_{4-n}(CH_3)_n$ is lithium borohydride and wherein the halophosphine is diphenylchlorophosphine.

4. The process of claim 1 wherein the compound $MBH_{4-n}(CH_3)_n$ is sodium borohydride and the halophosphine is diethylchlorophosphine.

5. The process of claim 1 wherein the compound $MBH_{4-n}(CH_3)_n$ is sodium borohydride and the halophosphine is a mixture of diethylchlorophosphine and ethyldichlorophosphine, the product being a mixed polymer having varying numbers of ethyl substituents on the phosphorus atom.

References Cited in the file of this patent

Burg et al.: "American Chemical Society Journal," vol. 75, pages 3872–7 (1953).